(12) United States Patent
Cameron et al.

(10) Patent No.: US 8,708,243 B2
(45) Date of Patent: Apr. 29, 2014

(54) THERMAL VALVE

(75) Inventors: Sean L. Cameron, Pendeford Wolverhampton (GB); Carl D. Burton, Newport Shropshire (GB)

(73) Assignee: HS Marston Aerospace Ltd. (GB)

( * ) Notice: Subject to any disclaimer, the term of this patent is extended or adjusted under 35 U.S.C. 154(b) by 782 days.

(21) Appl. No.: 12/907,745

(22) Filed: Oct. 19, 2010

(65) Prior Publication Data

US 2012/0090815 A1 Apr. 19, 2012

(51) Int. Cl.
*G05D 23/02* (2006.01)

(52) U.S. Cl.
USPC .................. 236/93 R; 236/101 R; 236/101 D; 236/103

(58) Field of Classification Search
USPC ............ 236/93 R, 101 R, 101 D, 101 E, 103; 137/468; 251/337
See application file for complete search history.

(56) References Cited

U.S. PATENT DOCUMENTS

| | | | |
|---|---|---|---|
| 4,028,324 A | 6/1977 | Tuschner et al. | |
| 4,100,762 A | 7/1978 | Davis et al. | |
| 4,195,774 A | 4/1980 | Warner | |
| 4,242,042 A | 12/1980 | Schwarz | |
| 4,283,006 A | 8/1981 | Fedewitz | |
| 4,488,680 A | 12/1984 | Itoh | |
| 4,522,219 A * | 6/1985 | Ohkata | 137/62 |
| 4,523,605 A * | 6/1985 | Ohkata | 137/62 |
| 4,570,852 A | 2/1986 | Ohkata | |
| 4,759,187 A | 7/1988 | O'Hare | |
| 5,261,597 A | 11/1993 | Perlman et al. | |
| 5,497,734 A | 3/1996 | Okada | |
| 5,517,959 A | 5/1996 | Kato et al. | |
| 5,803,354 A * | 9/1998 | Benedict | 236/12.2 |
| 5,865,418 A | 2/1999 | Nakayama et al. | |
| 5,878,949 A * | 3/1999 | Matsui et al. | 236/93 R |
| 6,425,343 B1 | 7/2002 | Akers et al. | |
| 6,464,200 B1 | 10/2002 | Hines et al. | |
| 6,651,441 B2 | 11/2003 | Reuter et al. | |
| 6,682,016 B1 | 1/2004 | Peroulakis | |

(Continued)

FOREIGN PATENT DOCUMENTS

| EP | 0841510 B1 | 1/2002 |
|---|---|---|
| EP | 1302711 A1 | 4/2003 |

(Continued)

OTHER PUBLICATIONS

Extended European Search Report for EP Application No. 11250859.3-2422, dated Feb. 2, 2012, pp. 1-7.

*Primary Examiner* — Marc Norman (74) *Attorney, Agent, or Firm* — Cantor Colburn LLP (57) ABSTRACT

A valve includes a housing and a valve seat and a structure fixedly disposed remote from the valve seat, a valve head to open and close the valve seat, fluid being permitted to flow when the valve seat is open and an elastic system anchored on the structure and coupled to the valve head, the elastic system including a biasing element and an elastic element formed of memory metal alloy disposed to contact fluid permitted to flow, the biasing element and the elastic element being configured to cooperatively move the valve head toward a valve seat open position when a fluid temperature is below a lower limit, and the biasing element and the elastic element being further configured to cooperatively move the valve head toward a valve seat closed position in opposition to the biasing element when the fluid temperature is above an upper limit.

20 Claims, 5 Drawing Sheets

(56) References Cited

U.S. PATENT DOCUMENTS

| | | |
|---|---|---|
| 7,506,735 B2 | 3/2009 | Kloucek et al. |
| 7,540,431 B2 | 6/2009 | Kozdras et al. |
| 8,353,462 B2 * | 1/2013 | Todaka et al. .............. 236/12.11 |
| 2001/0038082 A1 | 11/2001 | Hines et al. |
| 2004/0226613 A1 | 11/2004 | Ono |
| 2009/0007972 A1 * | 1/2009 | Lum et al. .................... 137/468 |
| 2010/0025158 A1 | 2/2010 | Allam |

FOREIGN PATENT DOCUMENTS

| | | |
|---|---|---|
| GB | 2217816 A | 11/1989 |
| JP | 60201176 A | 10/1985 |
| WO | 9612994 A1 | 5/1996 |
| WO | 2008022874 A1 | 2/2008 |

* cited by examiner

THERMAL VALVE

BACKGROUND OF THE INVENTION

The subject matter disclosed herein relates to a thermal valve and, more particularly, to a thermal valve including an elastic element formed of memory metal alloy (elastic MMA).

In various applications, such as the automotive and aircraft industries, thermal valves are commonly installed in inlet or outlet ports of heat exchangers where header tanks connect the inlet and outlet ports of a fluid stream. The valves serve to balance the flow between the inlet and the outlet ports connecting the headers and the heat exchanger core headers, thereby maintaining required fluid temperatures and pressures. To this end, the valves generally incorporate a heat and/or pressure relief mechanism whereby, if the system heat or pressure reaches a critical point, the valve allows fluid to bypass the heat exchanger core to prevent, for example, over pressurisation in the heat exchanger core and potential damage.

Currently, the heat release mechanism of typical thermal valves relies on wax extension technology using either a flat elastomer diaphragm or an elastomer bag. In the case of the elastomer bag, as the wax heats, it expands and exerts a force on the elastomer bag and a piston assembly coupled to the bag to close the valve. By contrast, as the wax cools, it contracts and causes the piston assembly to return to its initial position.

In practice, it has been observed that wax extension technology presents certain drawbacks. In particular, the wax tends to lose its memory after a given number of thermal cycles. Also, wax tends to have a slow thermal response characteristic, which makes the timing of the thermal valves difficult to manage. Further, wax extension technology requires structural elements for containing the wax so that wax and oil contamination can be avoided.

BRIEF DESCRIPTION OF THE INVENTION

According to an aspect of the invention, a valve is provided and includes a housing defining an interior and including a valve seat and a structure fixedly disposed remote from the valve seat, a valve head to open and close the valve seat, fluid being permitted to flow into the interior when the valve seat is open and an elastic system anchored on the structure and coupled to the valve head, the elastic system including a biasing element and an elastic element formed of memory metal alloy disposed to contact fluid permitted to flow into the interior, the biasing element and the elastic element being configured to cooperatively move the valve head toward a valve seat open position when a fluid temperature is below a lower limit, and the biasing element and elastic element being configured to cooperatively to move the valve head toward a valve seat closed position when the fluid temperature is above an upper limit.

According to another aspect of the invention, a valve is provided and includes a housing defining an interior and including a valve seat and a structure fixedly disposed remote from the valve seat, a valve head to open and close the valve seat, fluid being permitted to flow into the interior when the valve seat is open and an elastic system anchored on the structure and coupled to the valve head, the elastic system including a biasing element and an elastic element formed of memory metal alloy disposed to contact fluid permitted to flow into the interior, the biasing element and the elastic element being configured to cooperatively move the valve head toward a valve seat open position when a fluid temperature is within a lower range, and the biasing element and elastic element being configured to cooperatively to move the valve head toward a valve seat closed when the fluid temperature is within an upper range.

According to yet another aspect of the invention, a heat exchange apparatus is provided and includes a heat exchange unit, a housing defining an interior and an entrance to the heat exchange unit, the housing including a valve seat and a structure fixedly disposed remote from the valve seat, a valve head to open and close the valve seat, fluid being permitted to flow into the interior when the valve seat is open and being forced to flow through the entrance when the valve is closed and an elastic system anchored on the structure and coupled to the valve head, the elastic system including a biasing element and an elastic element formed of memory metal alloy disposed to contact fluid permitted to flow into the interior, the biasing element and the elastic element being configured to cooperatively move the valve head toward a valve seat open position when a fluid temperature is below a lower limit, and the elastic element being further configured to move the valve head toward a valve seat closed position in opposition to the biasing element when the fluid temperature is above an upper limit.

According to yet another aspect of the invention, a valve is provided and includes a housing defining an interior and including a valve seat and a structure fixedly disposed remote from the valve seat, a valve head to open and close the valve seat, fluid being permitted to flow into the interior when the valve seat is open and an elastic system anchored on the structure and coupled to the valve head, the elastic system including a biasing element and an elastic element formed of memory metal alloy disposed to contact fluid permitted to flow into the interior, the biasing element and the elastic element being configured to cooperatively move the valve head toward a valve seat close position when the fluid temperature is below a lower limit, and the biasing element and the elastic element being configured to cooperatively move the valve head toward a valve seat open position when the fluid temperature is above an upper limit.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

With reference to FIGS. 1-5, a heat exchange apparatus 10 is provided for use with, e.g., aircraft, automotive or gas turbine engine industries. The heat exchange apparatus 10 includes a heat exchange matrix 11 to which at least one or two matrix header tanks 12 are fluidly coupled. The heat exchange apparatus 10 receives a supply of fluid, such as oil, via inlet 13, which is fluidly coupled to conduit 14 by which the fluid flows to valve 15. Valve 15 is installed in or proximate to outlet port 16 and is configured to admit a supply of the fluid to at least the heat exchange matrix 11 in accordance with a temperature thereof so as to maintain an overall temperature of the fluid flowing through the outlet port 16. For example, where the fluid is oil, if the oil is too hot, the valve 15 may be configured to close such that the oil is forced into the heat exchange matrix 11 where it is cooled before being permitted to flow through the outlet port 16. By contrast, if the oil is cool, the valve 15 may open so as to allow the oil to flow directly through the outlet port 16 without entering the heat exchange matrix 11.

The valve 15 includes a housing 20, a valve head 40 and an elastic system 60. The housing 20 is formed to define an interior 21 and an outer region 22 leading to an entrance to the heat exchange matrix 11. The housing 20 includes a valve seat 23 and a structure 24, which is fixed in position and disposed remotely from the valve seat 23. The valve head 40 occupies and moves between open positions at which the valve seat 23 is opened and closed positions at which the valve seat 23 is closed. When the valve seat 23 is open, the fluid is permitted to flow from conduit 14 and into the interior 21. By contrast, when the valve seat 23 is closed, the fluid is forced to flow from conduit 14 to the header tanks 12 leading to the heat exchange matrix 11.

The elastic system 60 is anchored at one end thereof on the structure 24 and coupled at a mid-section thereof or at another end thereof to the valve head 40. The elastic system 60 includes at least a biasing element 70 and an elastic element 80. The elastic element 80 is formed of memory metal alloy (MMA), which is disposed to contact the fluid that is permitted to flow into the interior 21. Both the biasing element 70 and the elastic element 80 may include, for example, compressive springs and/or tensile springs in accordance with the various embodiments described herein.

By way of the coupling between the elastic system 60 and the valve head 40, the biasing element 70 and the elastic element 80 are configured to cooperatively move the valve head 40 toward a valve seat 23 open position when a fluid temperature of the fluid permitted to flow into the interior 21 is below a lower limit. Conversely, when the fluid temperature is above an upper limit, the biasing element 70 and the elastic element 80 are configured to cooperatively move the valve head 40 toward a valve seat 23 closed position. In accordance with alternative embodiments, the biasing element 70 and the elastic element 80 may be configured to cooperatively move the valve head 40 toward a valve seat 23 clsoed position when a fluid temperature of the fluid permitted to flow into the interior 21 is below a lower limit and, conversely, when the fluid temperature is above an upper limit, the biasing element 70 and the elastic element 80 may be configured to cooperatively move the valve head 40 toward a valve seat 23 open position.

That is, a material of the MMA is chosen such that a spring rate of the MMA may be below a bias spring rate of the biasing element 80 when the fluid temperature is below the lower limit and gradually rises above the bias spring rate of the biasing element 80 as the fluid temperature increases above the upper limit to force a displacement of the valve head 40. More particularly and, with reference to FIGS. 2 and 3, the material of the MMA is chosen such that, at a first temperature and with the elastic element 80 compressed, the movement of the valve head 40 begins and subsequently reaches its full displacement at a second temperature. Similarly, at a third temperature and with the elastic element 80 fully extended, the movement of the valve head 40 in the opposite direction begins and subsequently reaches its original non-displaced position at a fourth temperature. By contrast, with reference to FIGS. 4 and 5, the elastic element 80 is tensile rather than compressive and is extended by the biasing element 70 at the first and fourth temperatures. Between the first and second temperatures, the spring rate of elastic element 80 rises above that of biasing element 70 enabling it to compress, while between the third and fourth temperatures, the spring rate of the elastic element 80 falls below that of biasing element 70 allowing the biasing element to extend it.

In some embodiments, the first, second, third and fourth temperatures may all be different. As compared to wax extension technologies, the use of the MMA allows for a large fluid temperature gap between valve seat 23 opening and closing. Moreover, the first, second third and fourth temperatures are defined significantly more discreetly than what would otherwise be possible. That is, where the fluid temperature gap or range is relatively large, if the first-fourth temperatures are defined as sub-ranges, the sub-ranges are substantially narrow as compared to the breadth of the overall fluid temperature range.

The valve 15 may further include a shaft 90 by which the valve head 40 and the elastic system 60 are coupled to one another. This coupling is achieved by way of a disc 91 being coupled or anchored to the biasing element 70 and the elastic element 80. The shaft 90 fixedly extends through the disc 91 such that axial movement of the shaft 90 and the valve head 40 is directly proportional to axial movement of the disc 91, which is caused by compression and extension of the biasing element 70 and the elastic element 80. Dampers 92 may be disposed along the shaft 90 on either side of the disc 91 to provide damping as oil movement is impinged during vibration input or compression and extension of the biasing element 70 and the elastic element 80. With the valve head 40 movable due to the action of the elastic system 60, the valve head 40 may include a tapered lead end 41 that guidably engages with an aperture 42 of the valve seat 23. The tapering of the lead end 41 may be directed in any direction in accordance with a direction of the movement of the valve head 40 to open and close the valve seat 23.

The valve 15 still further includes a housing 100, to which the elastic system 60 may be coupled and which is coupled to the structure 24 such that at least a portion of the housing 100 is fixed relative to the structure 24 and the valve seat 23. The structure 24 may include a pad formed to define a threaded hole for fitting of a valve extraction tool. The housing 100 includes a first part 101, which is fixedly connected to the structure 24, and a second part 102, which is porous to the fluid permitted to enter the interior 21 such that the fluid is able to contact the elastic element 80. The second part 102 includes an end face 103 through which the shaft 90 extends. In some embodiments, the second part 102 may be configured to be movable relative to the first part 101 as the displacement of the valve head 40 occurs. The movability of the second part 102 is permitted by the cooperation of the guide slots 1010 defined in an inner wall of the first part 101 and the bosses 1020, which are disposed on an outer wall of the second part 102 and which move axially along the guide slots 1010 during valve head 40 displacement. Seals 104, such as o-rings, are disposed at an exterior of at least the first part 101 for sealing with, for example, the housing 20.

Figure 1:
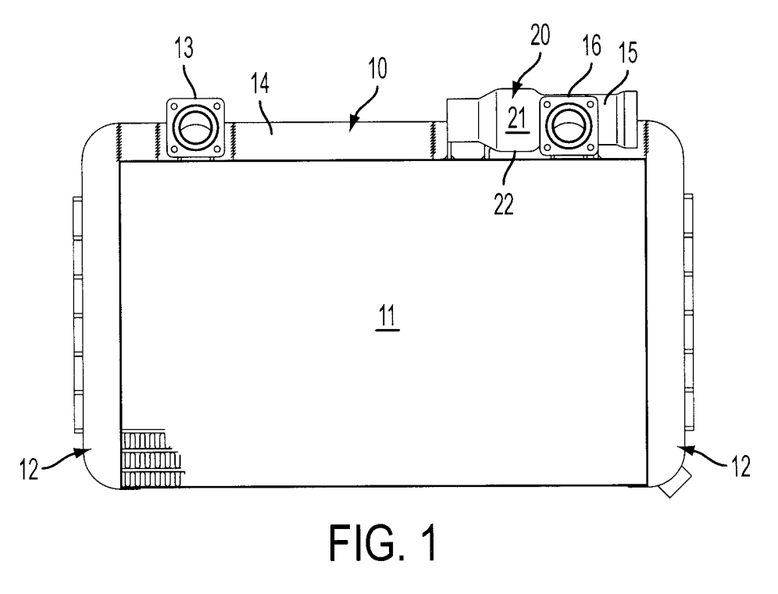
FIG. 1 is a plan view of a header tank.
Figure 2:
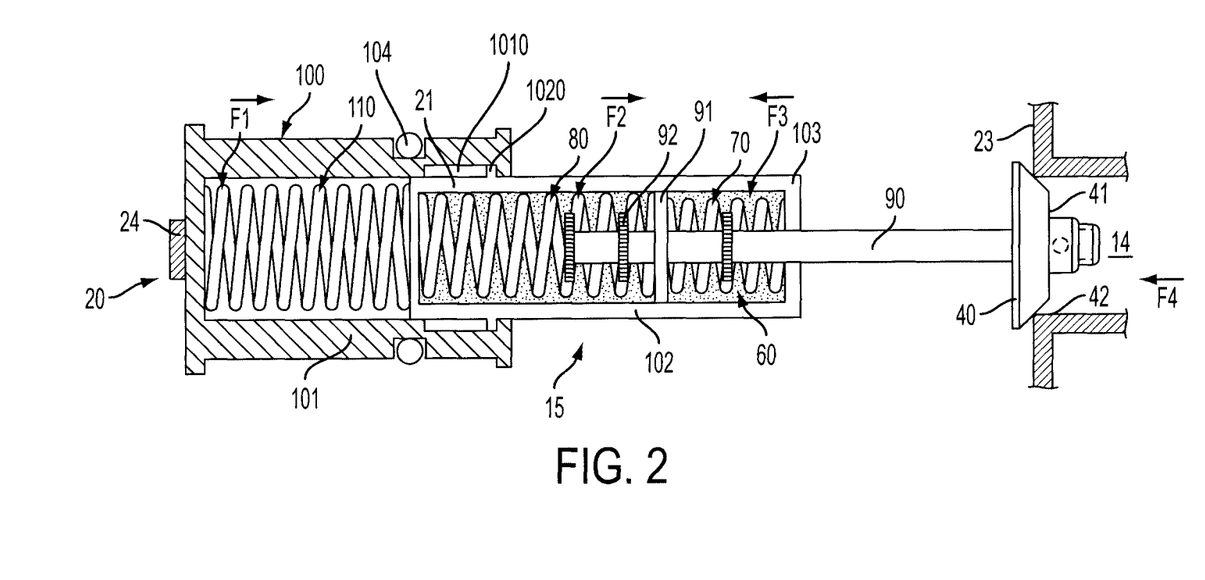
FIG. 2 is a schematic view of a thermal valve in accordance with alternate embodiments of the invention.
Figure 4:
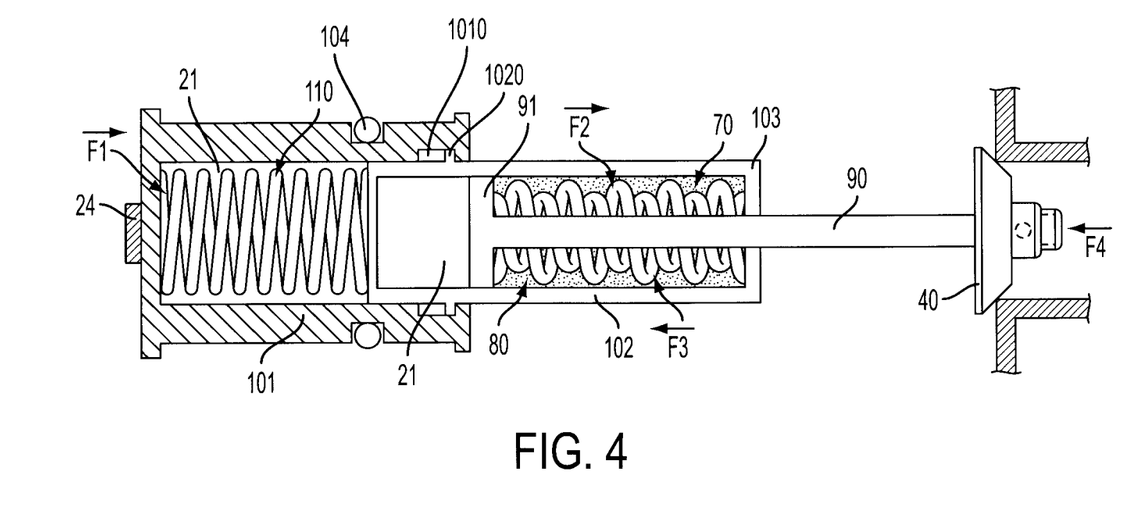
FIG. 4 is a schematic view of a thermal valve in accordance with alternate embodiments of the invention.

With reference to FIGS. 2 and 4, the valve 15 includes a pressure relief element 110, such as a compressive spring, which is disposed within the first part 101 and which is anchored on the first part 101 and the structure 24. The pressure relief element 110 is therefore supportively interposed between the structure 24 and the elastic element 80. As shown in FIG. 2, the elastic element 80 may be supportively interposed between the pressure relief element 110 and the biasing element 70. In accordance with alternate embodiments, however, as shown in FIG. 4, the biasing element 70 may be disposed substantially concentrically within the elastic element 80 in which case the pressure relief element 110 is supportively interposed between the structure 24 and the elastic element 80 and the biasing element 70. In the embodiments of FIGS. 2 and 4, the second part 102 is movable relative to the first part 101 although this is merely exemplary and not required. With the pressure relief element 110 in use, pressure relief action does not rely solely on the elastic element 80. Also, the pressure relief element 110 accommodates a spring force provided by the elastic element 80 and travel change.

Figure 3:
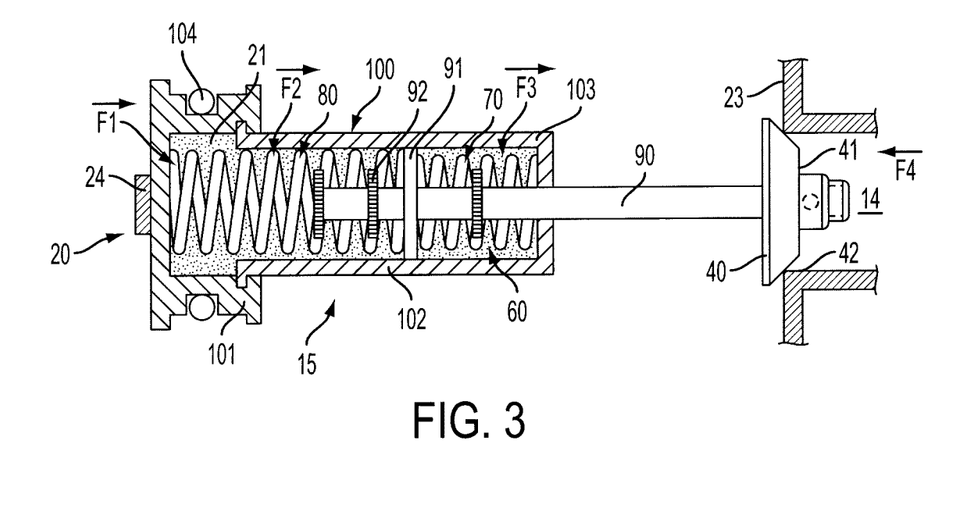
FIG. 3 is a schematic view of a thermal valve in accordance with alternate embodiments of the invention.
Figure 5:
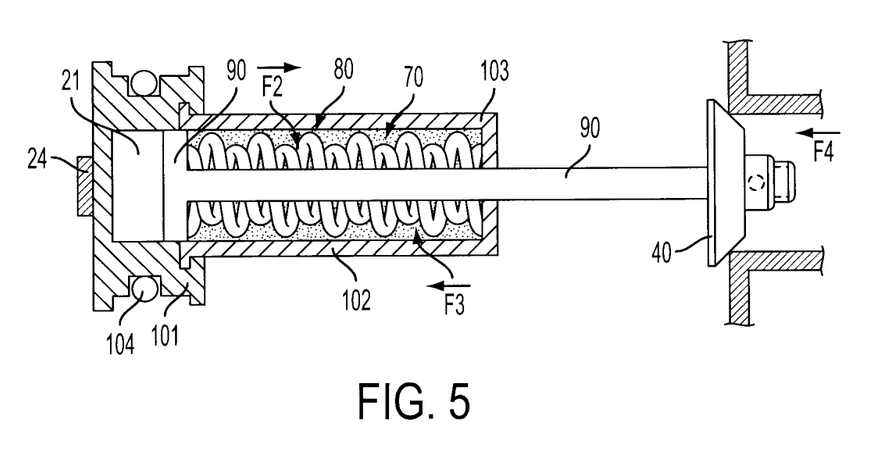
FIG. 5 is a schematic view of a thermal valve in accordance with alternate embodiments of the invention.

With reference to FIGS. 3 and 5, the pressure relief element 110 is removed since the elastic element 80 also performs the pressure relief function and the second part 102 is generally fixed relative to the first part 101 although this is, again, merely exemplary and not required. As shown in FIG. 3, the elastic element 80 is anchored on the first part 101 and the structure 24 and is supportively interposed between the structure 24 and the biasing element 70. In accordance with alternate embodiments, as shown in FIG. 5, the biasing element 70 is disposed substantially concentrically within the elastic element 80 and both are anchored on the end face 103.

For each embodiment described above, the elastic element 80 may be plural in number and arrayed around a longitudinal axis of the shaft 90. The end face 103 may include a spring cap defining an array of holes corresponding to the array of the elastic elements 80 and/or tuned to damp motion/oscillation. In addition, in the embodiments of FIGS. 2 and 3, the pressure relief element 110, the elastic element 80 and the biasing element 70 are each formed of compressive springs. By contrast, in the embodiments of FIGS. 4 and 5, the elastic element 80 is formed of a tensile spring.

For each embodiment, a maximum value of force, F3, applied to the shaft 90 by the elastic element 80 is equal to or substantially similar to ⅓ of a maximum value of force, F2, applied by the biasing element 70. For the embodiments of FIGS. 2 and 4, a maximum value of the force, F2, is greater than a sum of the maximum value of the force, F3, and a maximum value of force, F4, applied to the valve head 40 by the fluid while a minimum value of force, F1, applied by the pressure relief element 110 is equal to or substantially similar to the force, F4. For the embodiments of FIGS. 3 and 5, on the other hand, a maximum value of the force, F2, is greater than a sum of the maximum value of the force, F3, and a maximum value of the force, F4. The relative value of the forces described above apply between the first and second temperatures and the third and fourth temperatures. For example, force, F2, becomes greater than force, F3, at a point between the first and second temperatures and force, F3, becomes greater than force, F2, at a point between the third and fourth temperatures. When the valve head 40 is not in contact with the valve seat 23 below the second and third temperatures, force, F4, does not act upon valve head 40.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A valve, comprising:
    a housing defining an interior and including a valve seat and a structure fixedly disposed remote from the valve seat;
    a valve head to open and close the valve seat, fluid being permitted to flow into the interior when the valve seat is open;
    an elastic system anchored on the structure and coupled to the valve head, the elastic system including a biasing element and an elastic element formed of memory metal alloy disposed to contact fluid permitted to flow into the interior,
    the biasing element and the elastic element being configured to cooperatively move the valve head toward a valve seat open position when the fluid temperature is below a lower limit, and
    the biasing element and the elastic element being configured to cooperatively move the valve head toward a valve seat closed position when the fluid temperature is above an upper limit; and
    further comprising a pressure relief element anchored on the structure and interposed between the structure and the elastic element.

2. The valve according to claim 1, further comprising:
    a shaft by which the valve head and the elastic system are coupled;
    a disc, coupled to the biasing element and the elastic element, through which the shaft fixedly extends; and
    dampers disposed along the shaft on either side of the disc.

3. The valve according to claim 1, further comprising a housing coupled to the structure, the housing including a first part, which is fixedly connected to the structure, and a second part, which is porous to the fluid.

4. The valve according to claim 3, wherein the second part is movable relative to the first part.

5. The valve according to claim 1, wherein the elastic element is interposed between the pressure relief element and the biasing element.

6. The valve according to claim 1, wherein the biasing element is disposed substantially concentrically within the elastic element.

7. The valve according to claim 1, wherein the elastic element is anchored on the structure.

8. The valve according to claim 7, wherein the biasing element is disposed substantially concentrically within the elastic element.

9. The valve according to claim 1, wherein the lower limit and the upper limit are substantially displaced along a total range of fluid temperatures.

10. The valve according to claim 1, wherein the biasing element and the elastic element are configured to cooperatively start movement of the valve head toward the valve seat open position when the fluid temperature is below the lower limit.

11. The valve according to claim 1, wherein the elastic element is further configured to start movement of the valve head toward the valve seat closed position in opposition to the biasing element when the fluid temperature is above the upper limit.

12. The valve according to claim 1, wherein respective materials of the memory metal alloy and the biasing element are chosen such that a spring rate of the memory metal alloy is below a bias spring rate of the biasing element when the fluid temperature is below the lower limit and gradually rises above the bias spring rate of the biasing element as the fluid temperature increases above the upper limit.

13. The valve according to claim 1, wherein respective materials of the memory metal alloy and the biasing element are chosen such that, at a first temperature and with the elastic element compressed, movement of the valve head begins and subsequently reaches full displacement at a second temperature, and, at a third temperature and with the elastic element fully extended, opposite movement of the valve head begins and subsequently reaches an original non-displaced position at a fourth temperature.

14. The valve according to claim 13, wherein the first, second, third and fourth temperatures are all different.

15. A valve, comprising:
a housing defining an interior and including a valve seat and a structure fixedly disposed remote from the valve seat;
a valve head to open and close the valve seat, fluid being permitted to flow into the interior when the valve seat is open;
an elastic system anchored on the structure and coupled to the valve head, the elastic system including a biasing element and an elastic element formed of memory metal alloy disposed to contact fluid permitted to flow into the interior,
the biasing element and the elastic element being configured to cooperatively move the valve head toward a valve seat open position when a fluid temperature is within a lower range, and
the biasing element and the elastic element being further configured to cooperatively move the valve head toward a valve seat closed position in opposition to the biasing element when the fluid temperature is within an upper range; and
further comprising a pressure relief element anchored on the structure and interposed between the structure and the elastic element.

16. The valve according to claim 15, wherein the lower range and the upper range are both substantially narrower than a total range of fluid temperatures.

17. The valve according to claim 15, wherein the biasing element and the elastic element are configured to cooperatively move the valve head toward the valve seat open position when the fluid temperature is near a low end of the lower range, and
wherein the elastic element is further configured to move the valve head toward the valve seat closed position in opposition to the biasing element when the fluid temperature is near an upper end of the upper range.

18. A heat exchange apparatus, comprising:
a heat exchange unit;
a housing defining an interior and an entrance to the heat exchange unit, the housing including a valve seat and a structure fixedly disposed remote from the valve seat;
a valve head to open and close the valve seat, fluid being permitted to flow into the interior when the valve seat is open and being forced to flow through the entrance when the valve is closed; and
an elastic system anchored on the structure and coupled to the valve head, the elastic system including a biasing element and an elastic element anchored on the structure with the biasing element disposed substantially concentrically within the elastic element, the elastic element being formed of memory metal alloy disposed to contact fluid permitted to flow into the interior,
the biasing element and the elastic element being configured to cooperatively move the valve head toward a valve seat open position when a fluid temperature is below a lower limit, and
the biasing element and the elastic element being further configured to cooperatively move the valve head toward a valve seat closed position in opposition to the biasing element when the fluid temperature is above an upper limit.

19. The heat exchange apparatus according to claim 18, wherein the heat exchange unit comprises a heat exchange matrix and at least one matrix header tank coupled to the heat exchange matrix.

20. A valve, comprising:
a housing defining an interior and including a valve seat and a structure fixedly disposed remote from the valve seat;
a valve head to open and close the valve seat, fluid being permitted to flow into the interior when the valve seat is open; and
an elastic system anchored on the structure and coupled to the valve head, the elastic system including a biasing element and an elastic element anchored on the structure with the biasing element disposed substantially concentrically within the elastic element, the elastic element being formed of memory metal alloy disposed to contact fluid permitted to flow into the interior,
the biasing element and the elastic element being configured to cooperatively move the valve head toward a valve seat close position when the fluid temperature is below a lower limit, and
the biasing element and the elastic element being configured to cooperatively move the valve head toward a valve seat open position when the fluid temperature is above an upper limit.

* * * * *